US008588797B2

(12) United States Patent
Kolding et al.

(10) Patent No.: US 8,588,797 B2
(45) Date of Patent: Nov. 19, 2013

(54) OPTIMIZING CONTROL CHANNEL PERFORMANCE WITH VIRTUAL INTER-CELL COORDINATION

(75) Inventors: Troels E. Kolding, Klarup (DK); Frank Frederiksen, Klarup (DK)

(73) Assignee: Nokia Siemens Networks Oy, Espoo (FI)

( * ) Notice: Subject to any disclaimer, the term of this patent is extended or adjusted under 35 U.S.C. 154(b) by 107 days.

(21) Appl. No.: 12/817,383

(22) Filed: Jun. 17, 2010

(65) Prior Publication Data

US 2011/0312363 A1    Dec. 22, 2011

(51) Int. Cl.
*H04W 72/00* (2009.01)
*H04W 4/10* (2009.01)

(52) U.S. Cl.
USPC ......... 455/450; 455/451; 455/452.1; 370/341

(58) Field of Classification Search
USPC ........... 455/422.1, 428, 432.1, 434, 437–455, 455/456.5, 456.6, 464, 9, 509–513, 515, 455/513.5, 63.1, 560, 114.2, 115.3, 116.2, 455/226.1, 524, 525, 62, 67.11, 67.13; 370/322, 329–334, 341, 348, 395.4, 370/436, 437, 439, 443, 444, 461–463
See application file for complete search history.

(56) References Cited

U.S. PATENT DOCUMENTS

| | | | | |
|---|---|---|---|---|
| 7,020,110 | B2 * | 3/2006 | Walton et al. | 370/334 |
| 7,903,605 | B2 * | 3/2011 | Cheng et al. | 370/328 |
| 2008/0212460 | A1 * | 9/2008 | Sampath | 370/203 |
| 2009/0047971 | A1 * | 2/2009 | Fu | 455/450 |
| 2010/0034151 | A1 * | 2/2010 | Alexiou et al. | 370/329 |
| 2010/0190447 | A1 * | 7/2010 | Agrawal et al. | 455/63.1 |

OTHER PUBLICATIONS

3GPP TS 36.213 V9.1.0 (Mar. 2010), 3$^{rd}$ Generation Partnership Project; Technical Specification Group Radio Access Network; Evolved Universal Terrestrial Radio Access (E-UTRA); Physical Layer Procedures (Release 9).

* cited by examiner

*Primary Examiner* — San Htun
(74) *Attorney, Agent, or Firm* — Harrington & Smith

(57) ABSTRACT

Channel conditions within each of N contiguous cells is determined. Based on at least the determined N channel conditions, there is determined a set of the N cells which are to utilize joint scheduling, and resources for a control channel are jointly assigning to individual cells of the set of cells. In various embodiments, the channel conditions are SINR and load on the control channel; and the set of cells is decided based on potential for mutual interference and/or potential that the control channel will not be filled. The resource may be jointly assigned based on user priority, so that serially for each highest priority user resources are assigned, the assigned resources are then blocked from compiled lists of radio resources, the highest priority user is removed and a next highest priority user is then the highest priority user to continue in the serial iteration.

20 Claims, 3 Drawing Sheets

202: determine $n^{th}$ channel conditions within an $n^{th}$ cell for each of N contiguous cells 204: based on at least the determined N channel conditions, determine that of the N cells there is a set of cells which are to utilize joint scheduling 206: for the determined set of cells, jointly assign resources for a control channel to individual cells of the set of cells

Figure 2

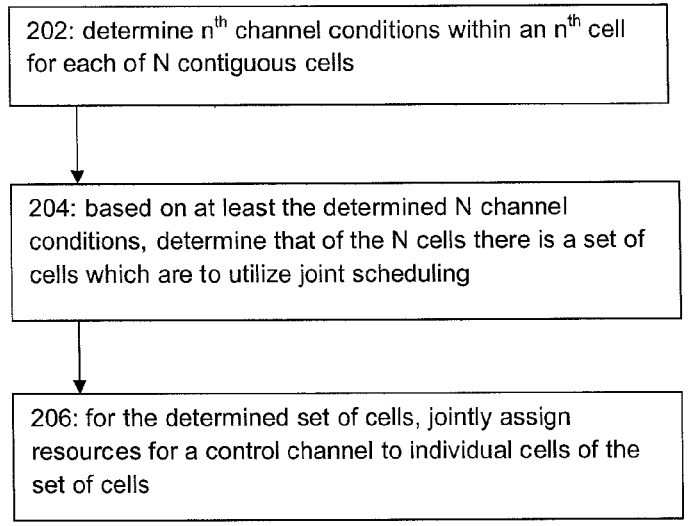

| Algorithm actions depending on situation | SINR conditions good in cells | SINR conditions poor in cells |
|---|---|---|
| Low amount of users to be sceduled | No efforts needed. Ensure as low error rates as possible for control channels through orthogonalization | Orthogonalize control channels, few users scheduled per TTI |
| High amount of users to be scheduled | Increase control channel capacity and increase multi-user diversity order | Orthogonalize control channels, ensure low aggregation levels more users scheduled per TTI with higher data rates |

Figure 3

OPTIMIZING CONTROL CHANNEL PERFORMANCE WITH VIRTUAL INTER-CELL COORDINATION

TECHNICAL FIELD

The exemplary and non-limiting embodiments of this invention relate generally to wireless communication systems, methods, devices and computer programs and, more specifically, relate to resource allocation for a control channel in a wireless communication system, such as for example a cooperative multi-point BTS hotel arrangement for a cellular macro-cell.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
  BTS base transceiver system
  CCE control channel element
  CoMP coordinated multi-point
  CQI channel quality indication
  c-RNTI cell-radio network temporary identifier
  eNB evolved Node-B
  H-eNB home eNB
  LTE long term evolution
  PDCCH physical downlink control channel
  REG resource element group
  RRM radio resource management
  SINR signal to interference and noise ratio
  UE user equipment
  WCDMA wideband code division multiple access Currently the view for future releases of LTE or even LTE-Advanced generally considers that the wireless communication bandwidth availability may be met by parsing the cells of the currently deployed macro-cell architectures into micro-cells. Two general approaches are seen; micro-radio cells and a BTS hotel architecture. The former is expected to deploy femto, pico and/or micro cells anywhere wireless radio coverage is desired, such as within buildings and tunnels and on street corners and lampposts. In this approach each remote radio head acts as its own BTS over a micro-cell and many such micro-cells fill up the macro-cell. The BTS hotel arrangement is expected to use a single BTS per macro cell with distributed antennas throughout so as to provide discrete coverage of the separate micro-areas. In this early stage of development each approach has certain advantages and disadvantages as compared to the other.

FIG. 1 gives a general overview of the BTS hotel concept. The macro cells 101, 102, 103 are arranged relative to one another similar to common architectures currently in place; each cell is under control of a single BTS and adjacent cells manage interference at the cell edges via cooperative techniques, such as joint processing or joint scheduling between two cells, or other interference mitigation techniques, like for instance beam forming. Within one cell 101 there is the controlling BTS 110 and a network of distributed nodes 112, 114, 116, 118 that interface to the BTS via wired connections (not shown, but which may be for example copper wire/coaxial cable or fiber optic cable/radio over optic fiber). Each of the central BTS 110 and the remote nodes 112, 114, 116, 118 are responsible for scheduling users within a designed area designated as respective areas 111, 113, 115, 117 and 119. Such an arrangement is sometimes termed a CoMP architecture, and is at least partially deployed across select cities such as New York and Seattle and also in Korea which utilizes fiber optic control connections over WCDMA repeaters.

Regardless of the specific implementation, the BTS hotel arrangement enables fast and efficient intra-cell communication over the wired connections and baseband processing at the BTS. These aspects can be exploited to introduce more efficiency in the BTS hotel-type network via centralized coordination at the BTS. These teachings continue the development of wireless communications in that direction.

SUMMARY

The foregoing and other problems are overcome, and other advantages are realized, by the use of the exemplary embodiments of this invention.

In a first aspect thereof the exemplary embodiments of this invention provide a method, comprising: determining $n^{th}$ channel conditions within an $n^{th}$ cell for each of N contiguous cells, in which n indexes from 1 through N and N is an integer at greater than one; based on at least the determined N channel conditions, determining that of the N cells there is a set of cells which are to utilize joint scheduling; and for the determined set of cells, jointly assigning resources for a control channel to individual cells of the set of cells.

In a second aspect thereof the exemplary embodiments of this invention provide a memory storing a program of computer readable instructions, that when executed by at least one processor result in actions comprising: determining $n^{th}$ channel conditions within an $n^{th}$ cell for each of N contiguous cells, in which n indexes from 1 through N and N is an integer at greater than one; based on at least the determined N channel conditions, determining that of the N cells there is a set of cells which are to utilize joint scheduling; and for the determined set of cells, jointly assigning resources for a control channel to individual cells of the set of cells.

In a third aspect thereof the exemplary embodiments of this invention provide an apparatus, comprising at least one processor and at least one memory storing computer program code. The at least one memory and the computer program code are configured, with the at least one processor, at least to: determine $n^{th}$ channel conditions within an $n^{th}$ cell for each of N contiguous cells, in which n indexes from 1 through N and N is an integer at greater than one; based on at least the determined N channel conditions, determine that of the N cells there is a set of cells which are to utilize joint scheduling; and for the determined set of cells, jointly assign resources for a control channel to individual cells of the set of cells.

In various other aspects the exemplary embodiments of this invention provide a method, a memory storing a program of computer readable instructions, and an apparatus comprising at least one processor and at least one memory storing computer program code, but in these various aspects detailed information on the deployment is obtained, as is detailed knowledge of the environment, and from these are estimated sets of cells which are to be used for joint scheduling. In a specific embodiment channel information for neighbor cells is assembled, and along with knowledge of the location of those neighbor cells and users in those cells the decision is made which cells will be participating in joint scheduling. Radio resources are then allocated to the decided cells.

These and other aspects of the invention are detailed with more particularity below.

BRIEF DESCRIPTION OF THE DRAWINGS

FIG. 2 is a logic flow diagram that illustrates, in accordance with an exemplary embodiment of this invention, the operation of a method, and a result of execution of computer program instructions embodied on a computer readable memory.

FIG. 3 is a decision chart showing scheduling decisions according to an exemplary embodiment of the invention given conditions of scheduling load in the cell and SINR conditions in the cell.

DETAILED DESCRIPTION

The invention is explained hereinafter by way of examples which are illustrating of but not limiting to the extent of these teachings. That is, while the examples are given as specific embodiments of the invention, the invention is not limited to only these embodiments and is adaptable to many varied environments which may even be dis-similar to those of these examples.

Figure 1:
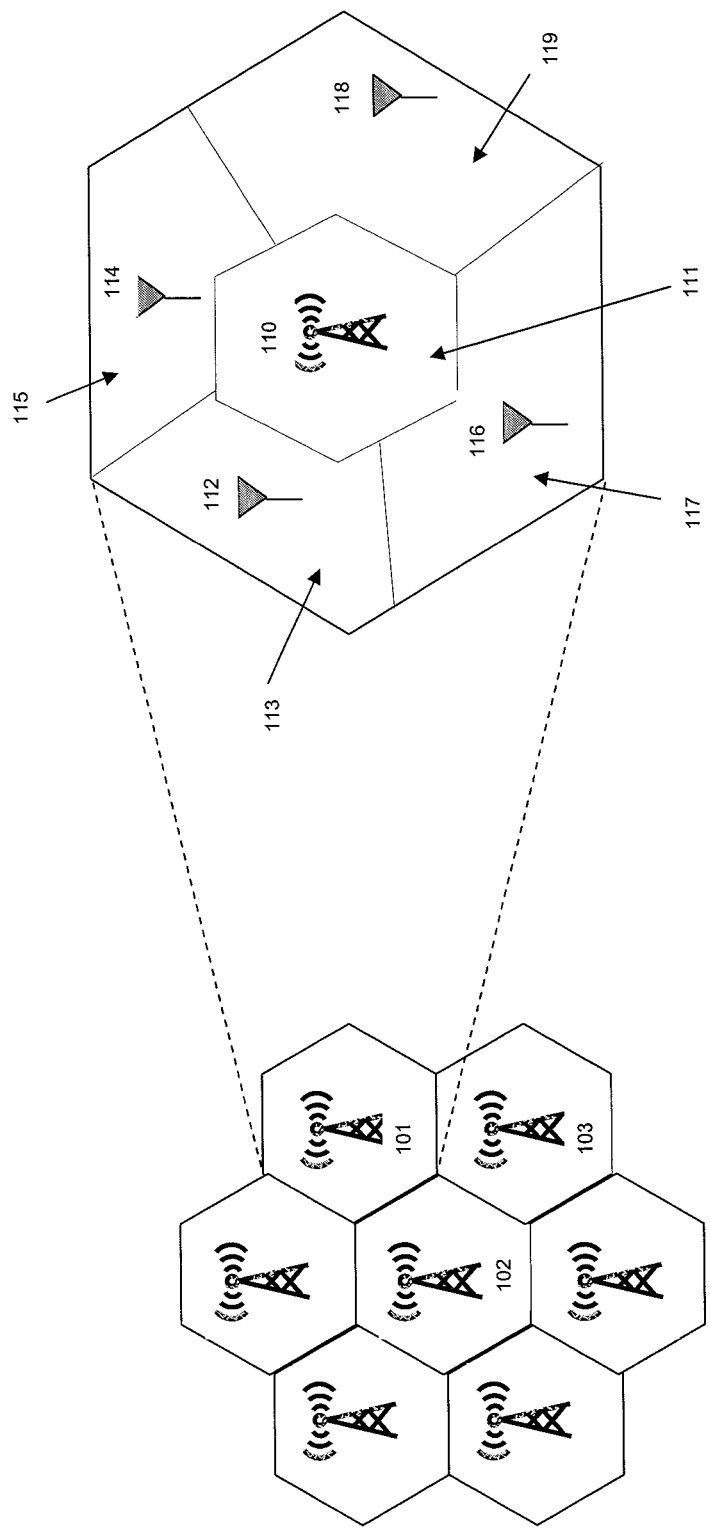
FIG. 1 is a schematic diagram illustrating adjacent macro-cells and detail of one macro cell implemented as a BTS hotel arrangement.

For the BTS hotel arrangement of nodes such as that shown in the macro cell 101 of FIG. 1, the examples below rely on at least four assumptions. Each of the micro-cells 111, 113, 115, 117 and 119 are referred to below as simply cells. There are high-bandwidth, low-delay connections between the BTS 110 and the remote transceivers 112, 114, 116, 118. There is sufficient processing power to do needed RRM and related data processing for a number of neighboring cells 111, 113, 115, 117 and 199. There is detailed knowledge accumulated at some central decision making authority (for example, the BTS 110) of the location of the transceivers 110, 112, 114, 116 and 118. And finally, there is a fine granularity grid of transceivers 110, 112, 114, 116 and 118 covering a larger geographical area. As will be detailed below, these assumptions enable exemplary but non-limiting embodiments of the present invention to make and implement scheduling decisions which are made available to the transceivers over a larger coordination area with essentially a zero or nearly zero delay. Such a larger coordination area is shown at FIG. 1 as the cell 101 consisting of the separate areas 111, 113, 115, 117 and 119.

In an exemplary embodiment of the invention there is a coordinated multi-cell approach for assigning a scheduling channel, which by example in LTE is termed a PDCCH. The coordination process would happen in a way so as to minimize the interference seen at one cell due to transmissions in a neighbor cell, the inter-cell interference.

There is at least a two-fold benefit of such exemplary but non-limiting embodiments. First, when the eNB coordination increases the SINR of the PDCCH, the required aggregation level will decrease correspondingly. Second, the combined-cell capacity of the PDCCH will increase, which allows for more simultaneously scheduled users and consequently even more multi-user diversity gain.

In an exemplary embodiment of the invention there is a centralized RRM function within the macro cell 101, such as might be located within the serving BTS 110, which simultaneously considers the group of neighboring cells/transceivers 112, 114, 116 and 118. As a brief overview of an exemplary embodiment of the invention, the central RRM function assembles channel information for the neighbor cells 113, 115, 117, 119 as well as for its own cell 111 (for the case that the central RRM function is at a node that also schedules its own cell 111), sees from the assembled channel information which of those cells are to be subjected to joint scheduling, and then using its centralized knowledge of the users in the various cells that are to be jointly scheduled the central RRM function jointly assigns resources for a control channel to individual cells of the set of cells.

For a straightforward understanding these different functions may be broken into individual components, including a load/SINR function or mechanism, an inter-cell PDCCH resource aware function or mechanism, and a joint assignment of resources function or mechanism.

The first of these observes or collects observations of load and SINR in each cell. For example, the observed instantaneous SINR and load in all of the neighboring cells 113, 115, 117 and 119 can be collected at the BTS 110 and added to the BTS's own observations of instantaneous SINR and load in its own cell 111. The SINR estimation could for example be based on detailed location and propagation conditions as well as the collected CQI measurement reports from individual UEs in the various cells of the network. SINR estimation could also be based on measurements from uplink sounding reference signals, which are transmitted by UEs in different cells to evaluate the channel conditions for different frequency sub bands. Average values of these signals might indicate the approximate path loss of the radio channel, and be indicative of the expected SINR per UE. Correspondingly, this load/SINR mechanism will also have information on the instantaneous load in each cell. For the specific case of these examples where the PDCCH resources are jointly assigned, the load concerns the number of UEs that are to be scheduled on the PDCCH, as well as the expected and experienced number of PDCCH resources occupied by each user. There may be a number of UEs active in the group of cells at any given time, but only a subset of them all have need of a PDCCH for scheduling, depending on whether the UE has indicated a need to send data uplink or if the network has data to send downlink to the UE.

The inter-cell PDCCH resource aware mechanism builds a set of lists with the radio channel resources that are available for the PDCCH. The PDCCH is transmitted on one or more aggregated control channel elements (CCEs) as known in the art, and each CCE is built from a set of nine (9) resource element groups (REGs). These REGs are distributed in time and frequency in such a way so as to obtain near-maximum frequency separation. Further, the construction of the CCEs from the REGs is randomized through different cell IDs. Additionally, the UE specific search spaces are also randomized through both UE ID (for example the c-RNTI) and subframe number. Randomization for the UE specific search space is detailed in particular for LTE at 3GPP TS 36.213 (v 9.1.0) at section 9.1.1. Other implementations may randomize the UE specific search space differently.

The mechanism for joint assignment of control channel resources in multiple cells utilizes the situations where it is observed that inter-cell interference might be high, or situations where it is observed that the control channel load might not become 100%. For such situations, the central RRM function/scheduler will start doing joint scheduling of the control channels for the two (or more) cells that are in such conditions.

In an exemplary embodiment, the joint control channel scheduling takes the UE with the highest priority and assigns control channel resources for it, in certain implementations this assignment is given to the transceiver of the cell in which that UE is operating and that transceiver actually sends the PDCCH to the UE. The needed REGs for the scheduled UE are reserved for that UE, or blocked from the list of radio resources noted above so they can't be utilized for a different UE in an inter-cell interference situation. Next, the second-most important UE within the set of jointly scheduled cells is scheduled. This second-most important UE is only allowed to be scheduled on CCE resources that are not at the same time taken by the first scheduled UE, which as above is assured by blocking those earlier-assigned resources on the list. This approach continues for all the UEs that need a PDCCH that are in the cells that are designated for joint scheduling, until all those UEs are assigned resources or the amount of available control channel resources is exhausted.

The above most-important iterative assigning presents what would typically be an ideal approach, where it is possible to utilize the most resource element groups. In an approach seen to be more practical given real-world constraints, the central RRM function/joint scheduler allows for some REGs to interfere with each other, and compensates for this interference when evaluating the needed SINR for the PDCCH. The scheduling approach would improve the SINR of the PDCCH while at the same time maintaining a relatively high control channel capacity, due to the instant per-cell interference coordination. As this approach introduces interference between control channels in neighboring cells, then any scheduled UE would use a lower aggregation level for transmission of scheduling information, and thus leave more control channel capacity for more users. For cases where there is more detailed knowledge of the coupling between the cells, there is also a joint scheduling approach, which would allow for more overlap between REG resources of different cells in case it is estimated that the relative interference between these is estimated to be low. Correspondingly, for cases where the relative interference between different cells is estimated to be high, the algorithm could allow only few overlapping REGs between assignments when scheduling the PDCCH resources.

FIG. 2 is a logic flow diagram that illustrates, in accordance with an exemplary embodiment of this invention, the operation of a method, and a result of execution of computer program instructions embodied on a computer readable memory. FIG. 2 is from the perspective of a centralized RRM function which may be embodied within the serving BTS 110 but can be implemented by certain components of a BTS 110 or by some other apparatus that exercises control over assigning resources for the PDCCH or other radio channel among the various nodes 110, 112, 114, 116, 118 of the network. In FIG. 2 there are a total of N nodes in which N is an integer greater than one, and which by example N=5 at FIG. 1.

At block 202 the central RRM node determines $n^{th}$ channel conditions within an $n^{th}$ cell for each of the N contiguous cells, in which n indexes from 1 through N. As in the non-limiting example above the channel conditions include, but are not limited to, signal to interference plus noise ratio and load on the control channel.

At block 204, and based on at least the determined N channel conditions, the RRM function determines that of the N cells there is a set of cells which are to utilize joint scheduling. As in the non-limiting examples above; the RRM function can determine the set of cells from among all of the N cells by determining either that there is a high potential for mutual interference among the set of cells, and/or that there is a high potential that the control channel/PDCCH will not be filled and so other UEs from other cells can be scheduled in it. Either of these may be implemented as a simple comparison of interference/load as measured against some threshold value which triggers joint scheduling, or a more precise algorithm may be employed to better maximize when joint scheduling is to be taken into use.

Then at FIG. 2 and for the determined set of cells that was determined at block 204, the centralized RRM function at block 206 jointly assigns resources for a control channel to individual cells of the set of cells.

In the above examples the control channel of FIG. 2 is a physical downlink control channel PDCCH, and further the RRM function further compiles lists for each cell of the set (and in an embodiment these lists are compiled for each of the N cells), each list comprising radio resources available for the PDCCH. As noted above, in LTE the radio resources comprise control channel elements.

Also as noted in the example above, jointly assigning the resources includes serially, for each highest priority user: assigning radio resources from the compiled lists to a highest priority user; blocking the assigned radio resources from the compiled lists; and removing the said highest priority user so that a next highest priority user remains as the highest priority user. The central RRM function can build the control channel elements from a set of resource element groups, and it may jointly assign resources for the control channel by specifically assigning resource element groups that interfere with one another only to an extent constrained by the channel conditions. That is to say, the central RRM function will choose to assign interfering REGs only to UEs in cells whose inter-cell interference, as determined from the information at block 202, is not excessive or under some pre-determined threshold. In that case and as noted above, the centralized RRM then can lower an aggregation level for a user equipment to which are assigned REGs that interfere with one another, based on the conditions of the interfering cells.

For the case in which the set of cells determined at block 204 is less than all N of the cells, then in an exemplary embodiment a remainder of the N cells, apart from the determined set of cells, are not jointly assigned resources for the control channel.

FIG. 3 illustrates a decision chart showing scheduling decisions according to an exemplary embodiment of the invention given conditions of scheduling load along the vertical axis and SINR conditions along the horizontal axis. Where SINR is high and there are not a large amount of UEs to schedule on the PDCCH as at quadrant 322, the RRM function can simply schedule as normal; minimizing error by choosing CCEs that will offer maximum orthogonality. Where SINR then becomes progressively lower as at quadrant 323, there is still no change but in order to meet quality of service targets the network may be forced to schedule fewer UEs per transmission time interval than it could if SINR were stronger. These two quadrants 322, 323 represent no joint scheduling.

Where SINR is high and there is a high amount of UEs to schedule on the PDCCH as at quadrant 324, the RRM function increases its capacity for scheduling on the PDCCH (as compared to quadrant 322) via joint scheduling which increases the multi-user diversity order. At block 324 there is still good orthogonality because channel SINR conditions allow the PDCCH to be fully utilized. Where SINR then becomes progressively lower yet there are still a high number of UEs to schedule as at quadrant 325, there may be REG assignments that are interfering to a certain extent, but the interference is controlled by assuring the SINR in the cell for that UE is not too low and further by reducing the aggregation level of one or both of the cross-interfering UEs. In this manner a larger number of UEs can be scheduled per transmission time interval as compared to quadrant 323. These two lowermost quadrants 324, 325 represent joint scheduling consistent with the examples given above.

One technical effect of the above exemplary embodiments of the invention is that all the cells 110, 112, 114, 116 and 118 in the system operate in a time-wise synchronous manner, so as to enable the control channels to be jointly transmitted and scheduled.

Figure 4:
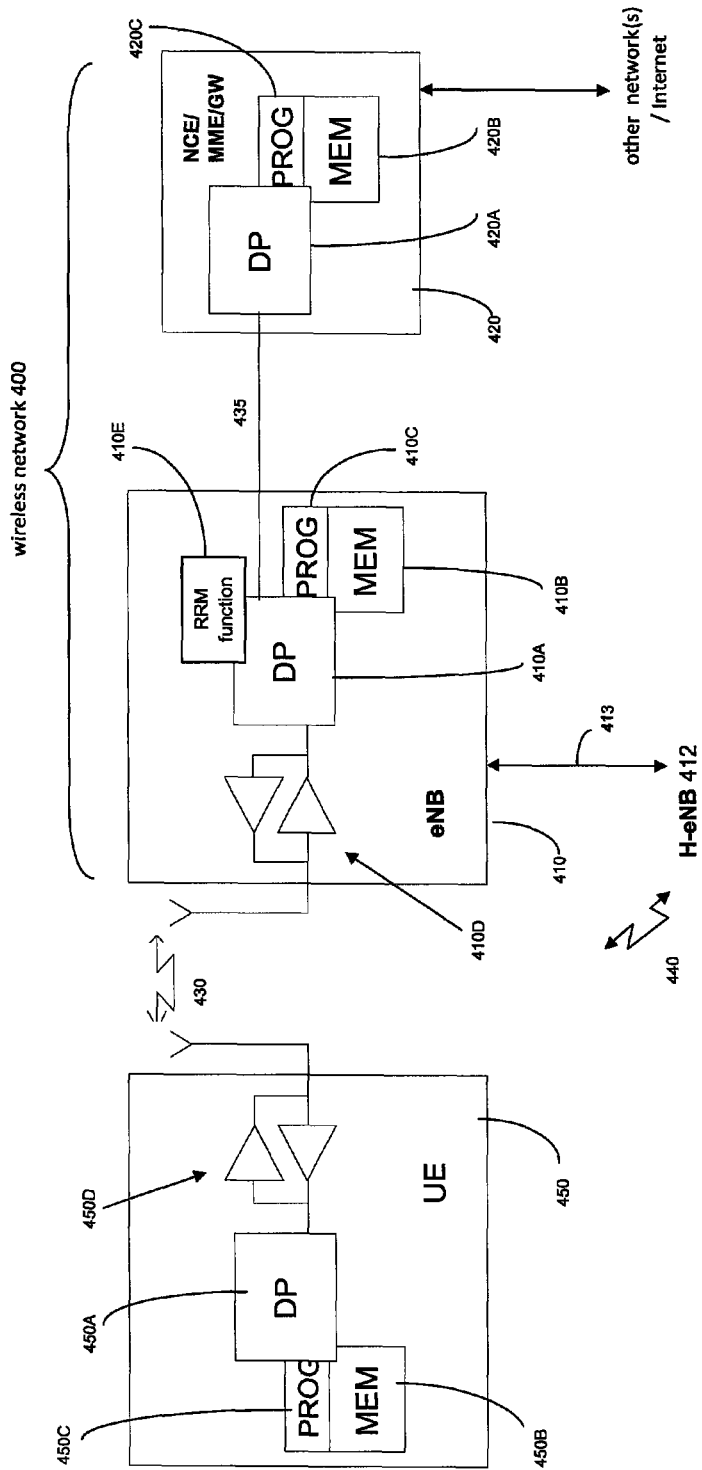
FIG. 4 shows a simplified block diagram of various electronic devices that are suitable for use in practicing the exemplary embodiments of this invention.

FIG. 4 is a simplified block diagram of various electronic devices and apparatus that are suitable for use in practicing the exemplary embodiments of this invention. In FIG. 4 a wireless network 400 is adapted for communication over a wireless link 430 with an apparatus, such as a mobile communication device such as the UE 450 to be scheduled, via a network access node, such as a Node B (base station), and by example a serving eNB 410.

Supporting the serving eNB 400 there is also a plurality of remote nodes of which one is shown at 412. These remote nodes 412 also have a wireless link 440 with the UE 450 and/or with other UEs in their own cell. The supporting node 412 may be a remote antenna for transmitting and receiving over the wireless link 440 or a separate and distinct remote radio head that includes at least a transceiver and antenna, as well as associated memory and processing hardware to operate. The network 400 may include a network control element (NCE) 420 which provides connectivity with a further network such as a telephone network and/or a data communications network (e.g., the internet).

The serving eNB 410 includes a controller, such as a computer or a data processor (DP) 410A, a computer-readable memory medium embodied as a memory (MEM) 410B that stores a program of computer instructions (PROG) 410C, and a suitable radio frequency (RF) transceiver 410D for bidirectional wireless communications with the UE 450 via one or more antennas. Typically the serving eNB 410 will have an array of antennas though single and multi-antenna implementations are within the scope presented herein. The eNB 410 is coupled via a data/control path 435 such as an S1 interface to the NCE 420. The eNB 410 may also be coupled to the supporting H-eNB 412 via a data/control path 413, which may be implemented as a wired or a wireless interface.

The UE 450 also includes a controller, such as a computer or a data processor (DP) 450A, a computer-readable memory medium embodied as a memory (MEM) 450B that stores a program of computer instructions (PROG) 450C, and a suitable RF transceiver 450D for communication with the eNB 410 via one or more antennas. In general, the various embodiments of the UE 450 can include, but are not limited to, cellular telephones, personal digital assistants (PDAs) having wireless communication capabilities, portable computers (such as laptops, palmtops, tablets and the like) having wireless communication capabilities, music storage and playback appliances having wireless communication capabilities, gaming devices having wireless Internet access for multiplayer interactive gaming, and other such portable units or terminals that incorporate combinations of such functions.

At least one of the PROGs 410C in the MEM 410B of the serving eNB 410 or other controlling apparatus is assumed to include program instructions that, when executed by the associated DP 410A, enable the device 410 to operate in accordance with the exemplary embodiments of this invention, such as those detailed above. That is, the exemplary embodiments of this invention may be implemented at least in part by computer software executable by the DP 410A of the eNB 410, or by hardware, or by a combination of software and hardware (and firmware). For completeness there is a RRM function 410E shown at the serving eNB 410 which causes the serving eNB 410 to implement the exemplary embodiments detailed above. Such an RRM function 410E may be hardware, software, or a combination of them both.

The computer readable MEMs 410B and 450B may be of any type suitable to the local technical environment and may be implemented using any suitable data storage technology, such as semiconductor based memory devices, flash memory, magnetic memory devices and systems, optical memory devices and systems, fixed memory and removable memory. The DPs 410A and 450A may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 2 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. A method, comprising:

determining, by a processor, channel conditions for each cell of a plurality of contiguous cells;

building a list of resource elements available for control channels in the plurality of contiguous cells;

based on at least the determined channel conditions for all cells of the plurality of contiguous cells, assigning resource elements from the list of resource elements to construct control channel elements for each cell, where construction of the control channel elements from the resource elements is randomized;

selecting a first set of cells from the plurality of contiguous cells, where control channel elements of cells in the first set of cells are relatively orthogonal;

selecting a second set of cells from the plurality of contiguous cells, where the second set of cells are to utilize joint scheduling; and jointly assigning resources for a control channel to individual cells of the second set of cells.

2. The method according to claim 1, in which the channel conditions comprise at least signal to interference plus noise ratio and load on the control channel.

3. The method according to claim 1, in which the cells are selected from the plurality of contiguous cells as a result of determining at least one of:

there is a high potential for mutual interference among the cells; and there is a high potential that the control channel will not be filled.

4. The method according to claim 1, in which the control channel is a physical downlink control channel (PDCCH), the method further comprising compiling lists for each cell of the set, each list comprising radio resources available for the PDCCH, and in which said radio resources comprising control channel elements.

5. The method according to claim 4, in which jointly assigning the resources comprises, serially for each highest priority user:

assigning radio resources from the compiled lists to a highest priority user;

blocking the assigned radio resources from the compiled lists; and removing the said highest priority user so that a next highest priority user remains as the highest priority user.

6. The method according to claim 4, in which the control channel elements are built from a set of resource element groups;

and in which jointly assigning resources for the control channel comprises assigning resource element groups that interfere with one another only to an extent constrained by the channel conditions.

7. The method according to claim 6, further comprising lowering an aggregation level for a user equipment to which are assigned resource element groups that interfere with one another, based on the interfering.

8. The method according to claim 1, in which the second set of cells comprises less than the plurality of contiguous of the cells and the first set of cells are not jointly assigned resources for the control channel.

9. The method according to claim 1, in which the plurality of contiguous cells form a base transceiver station hotel architecture.

10. A memory storing a program of computer readable instructions that when executed by at least one processor result in actions comprising:

determining, by a processor, channel conditions for each cell of a plurality of contiguous cells;

building a list of resource elements available for control channels in the plurality of contiguous cells;

based on at least the determined channel conditions for all cells of the plurality of contiguous cells, assigning resource elements from the list of resource elements to construct control channel elements for each cell, where construction of the control channel elements from the resource elements is randomized;

selecting a first set of cells from the plurality of contiguous cells, where control channel elements of cells in the first set of cells are relatively orthogonal;

selecting a second set of cells from the plurality of contiguous cells, where the second set of cells are to utilize joint scheduling; and jointly assigning resources for a control channel to individual cells of the second set of cells.

11. The memory according to claim 10, in which the control channel is a physical downlink control channel (PDCCH);

the actions further comprise compiling lists for each cell of the set, each list comprising radio resources available for the PDCCH, and in which said radio resources comprising control channel elements;

and in which jointly assigning the resources comprises, serially for each highest priority user:

assigning radio resources from the compiled lists to a highest priority user;

blocking the assigned radio resources from the compiled lists; and removing the said highest priority user so that a next highest priority user remains as the highest priority user.

12. An apparatus, comprising: at least one processor; and at least one memory storing computer program code; the at least one memory and the computer program code configured, with the at least one processor, at least to:

determine, by a processor, channel conditions for each cell of a plurality of contiguous cells;

build a list of resource elements available for control channels in the plurality of contiguous cells;

based on at least the determined channel conditions for all cells of the plurality of contiguous cells, assign resource elements from the list of resource elements to construct control channel elements for each cell, where construction of the control channel elements from the resource elements is randomized;

select a first set of cells from the plurality of contiguous cells, where control channel elements of cells in the first set of cells are relatively orthogonal;

select a second set of cells from the plurality of contiguous cells, where the second set of cells are to utilize joint scheduling; and jointly assign resources for a control channel to individual cells of the second set of cells.

13. The apparatus according to claim 12, in which the channel conditions comprise at least signal to interference plus noise ratio and load on the control channel.

14. The apparatus according to claim 12, in which the cells are selected from the plurality of contiguous cells as a result of the apparatus determining at least one of:

there is a high potential for mutual interference among the cells; and there is a high potential that the control channel will not be filled.

15. The apparatus according to claim 12, in which the control channel is a physical downlink control channel (PDCCH), and the at least one memory and the computer program code are configured with the at least one processor to further compile and store in the memory lists for each cell of the set, each list comprising radio resources available for the PDCCH, and in which said radio resources comprising control channel elements.

16. The apparatus according to claim 15, in which the at least one memory and the computer program code are configured with the at least one processor to jointly assign the resources by, serially for each highest priority user:

assigning radio resources from the compiled lists to a highest priority user;

blocking the assigned radio resources from the compiled lists; and removing the said highest priority user so that a next highest priority user remains as the highest priority user.

17. The apparatus according to claim 15, in which the at least one memory and the computer program code are configured with the at least one processor to:

build the control channel elements from a set of resource element groups;

and to jointly assign resources for the control channel by assigning resource element groups that interfere with one another only to an extent constrained by the channel conditions.

18. The apparatus according to claim 17, in which the at least one memory and the computer program code are configured with the at least one processor to further lower an aggregation level for a user equipment to which are assigned resource element groups that interfere with one another, based on the interfering.

19. The apparatus according to claim 12, in which the second set of cells comprises less than all of the plurality of contiguous of the cells, and the at least one memory and the computer program code are configured with the at least one processor to not jointly assign resources for the control channel to the first set of cells.

20. The apparatus according to claim 12, in which the apparatus comprises a base transceiver station and the plurality of contiguous cells comprise remote nodes forming a base transceiver station hotel architecture.

* * * * *